H. Stimmel.
Horse Rake.
N° 55930.  Patented Jun. 26, 1866.

Witnesses.
Inventor.
Henry Stimmel

Sheet 1 - 2 Sheets.

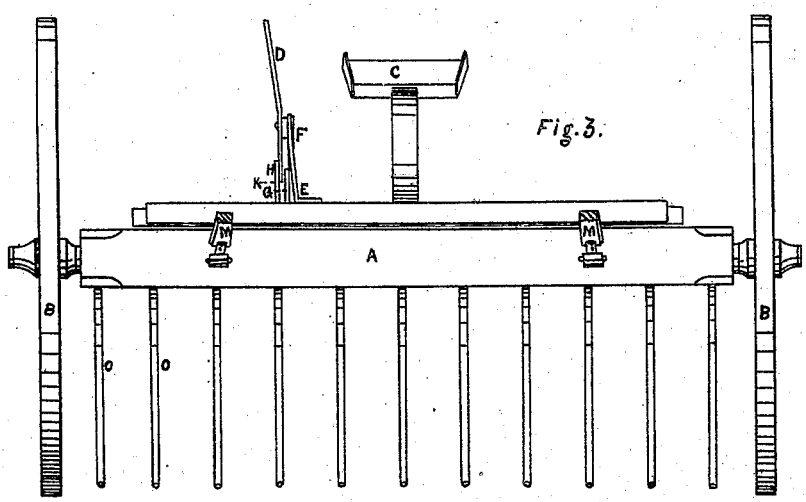
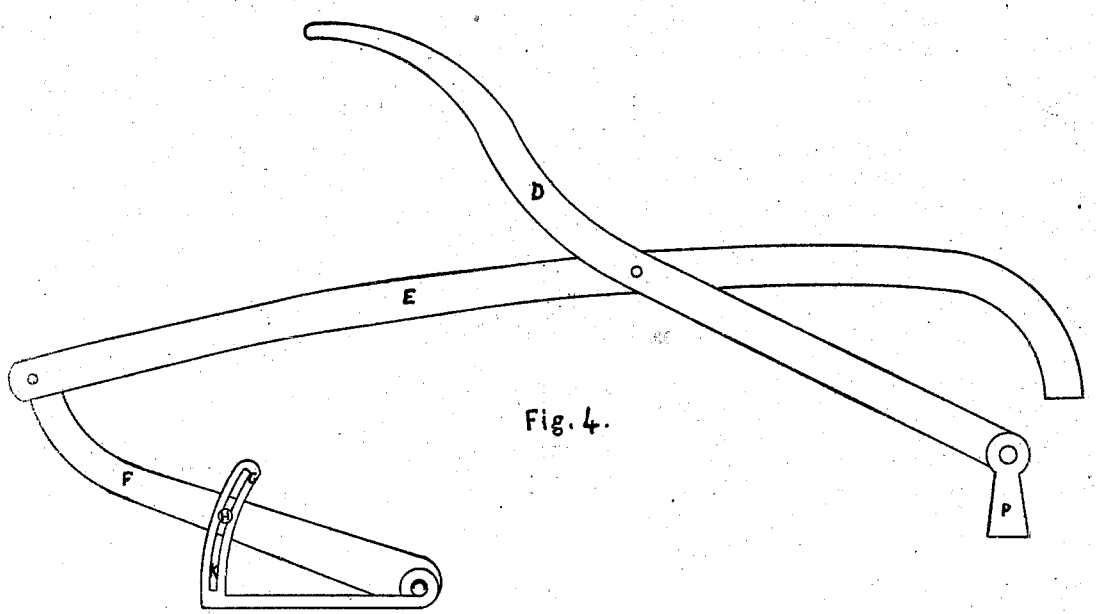

UNITED STATES PATENT OFFICE.

HENRY STIMMEL, OF CANTON, OHIO.

IMPROVEMENT IN HORSE-RAKES.

Specification forming part of Letters Patent No. 55,930, dated June 26, 1866.

*To all whom it may concern:*

Be it known that I, HENRY STIMMEL, of Canton township, in the county of Stark and State of Ohio, have invented new and valuable Improvements in Hay-Rakes; and I do hereby declare that the following is a full, clear, and exact description of the construction and operation of the same, reference being had to the annexed drawings, making a part of this specification, in which—

Figure 1:
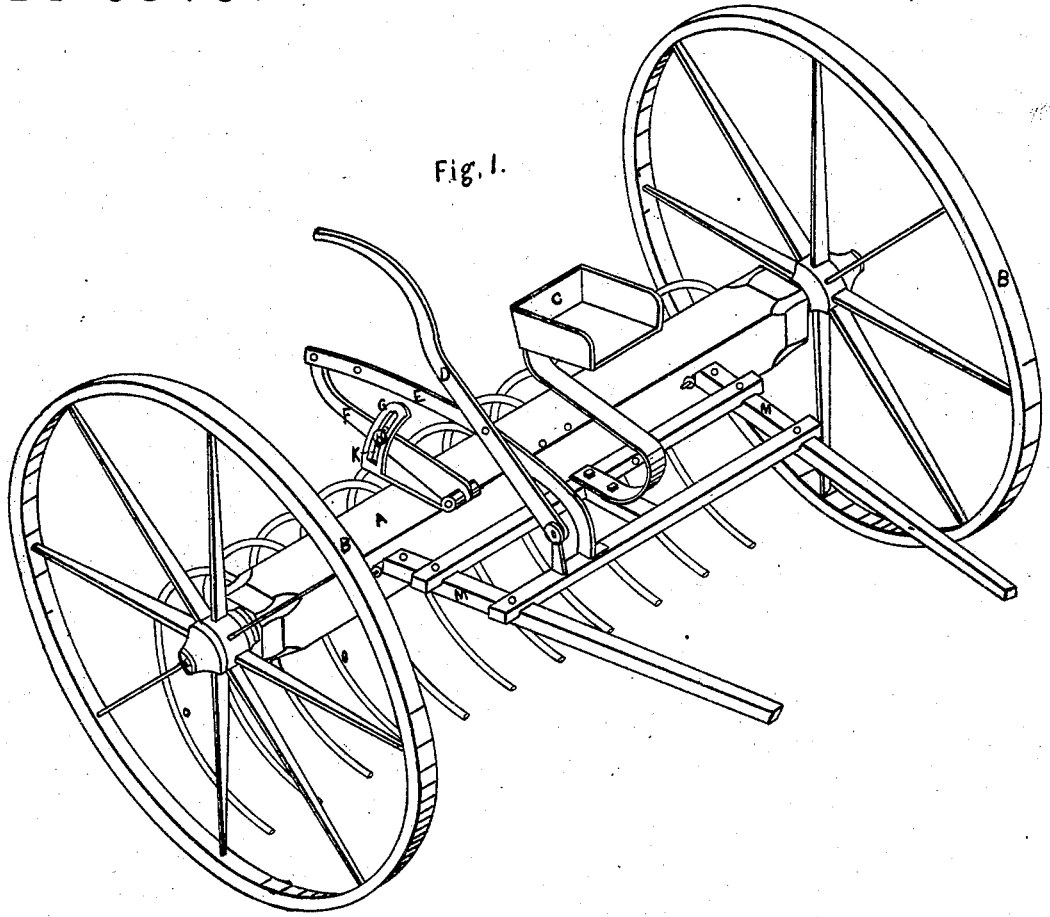
Figure 2:
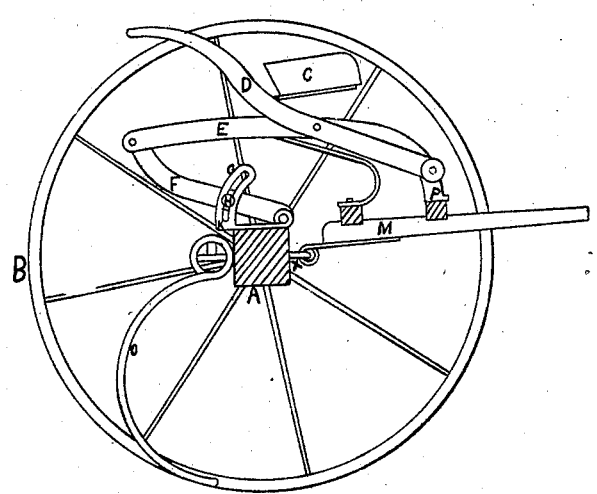

Figure 1 is a perspective view. Fig. 2 is a cross-section. Fig. 3 is a front view, and Fig. 4 a view of the levers detached from the rake.

I construct the rake in the ordinary form, with wheels, axle, spring-teeth, seat, levers, &c., giving to the driver the power of raising the teeth, allowing the hay to be left in winrows, and also allowing the teeth to be raised to pass over any obstacle, and clearing the teeth from the ground, so as to be easy of transportation.

My invention consists in constructing a peculiarly-shaped piece of iron with an arc on one side of its rear end, in which a slot is cut, and on a lever which connects the axle with the foot-lever I place a screw, which moves in the slot before mentioned, so that the position of the points of the teeth with reference to the ground may be altered at pleasure, the foot-lever, shafts, and hand-lever remaining in a constant position.

To enable others skilled in the art to make and use my invention, I will proceed to describe its construction and operation.

A is the axle of the rake; B, the wheels; C, the seat; O, the spring-teeth; E, the foot-lever for holding the teeth down to the ground; D, the hand-lever for lifting the teeth, so as to leave the hay in winrows; F, the lever connecting the axle A and foot-lever E; M, the shafts, which are connected to the axle at X. The hand-lever D is connected to the shafts by the iron P. On the axle A, I place the peculiarly-formed iron G, having a slot, K, therein, through which passes the screw H, which works into the lever F.

It will be seen that by moving the screw H from one end of the slot to the other the points of the teeth will be raised or lowered, as the case may be, the shafts M, foot-lever E, and hand-lever D maintaining a constant position with reference to each other.

What I claim as my invention, and desire to secure by Letters Patent, is—

The combination, of the peculiarly-shaped iron G, having a slot, K, therein, with the screw H, in connection with the lever F, substantially in the manner and for the purpose specified.

HENRY STIMMEL.

Witnesses:
 J. ABBOTT,
 GEO. T. TILDEN.